United States Patent
Norton et al.

(10) Patent No.: US 10,957,999 B1
(45) Date of Patent: Mar. 23, 2021

(54) STACKING CABLED INPUT/OUTPUT SLOTS

(71) Applicant: HEWLETT PACKARD ENTERPRISE DEVELOPMENT LP, Houston, TX (US)

(72) Inventors: John Norton, Houston, TX (US); Vincent Nguyen, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/669,908

(22) Filed: Oct. 31, 2019

(51) Int. Cl.
  *H01R 12/59* (2011.01)
  *H01R 27/02* (2006.01)
  *H01R 25/00* (2006.01)
  *G05B 19/042* (2006.01)

(52) U.S. Cl.
  CPC ........... *H01R 12/59* (2013.01); *H01R 25/003* (2013.01); *H01R 27/02* (2013.01); *G05B 19/0423* (2013.01)

(58) Field of Classification Search
  CPC ...... H01R 12/59; H01R 12/613; H01R 12/62; H01R 12/721; H01R 12/73; H01R 25/003; H01R 27/02; G05B 19/0423; G06F 1/184–186; G06F 13/409; G06F 13/4095; H05K 1/14; H05K 1/144
  See application file for complete search history.

(56) References Cited

U.S. PATENT DOCUMENTS

| | | | |
|---|---|---|---|
| 5,201,038 A * | 4/1993 | Fielder | G06F 13/4095 439/74 |
| 5,754,796 A * | 5/1998 | Wang | G06F 13/409 439/74 |
| 5,793,998 A | 8/1998 | Copeland et al. | |
| 5,953,540 A * | 9/1999 | Raymond | G06F 13/409 326/30 |
| 6,075,704 A * | 6/2000 | Amberg | G06F 13/409 361/729 |
| 6,356,959 B1 | 3/2002 | Thomas et al. | |
| 6,477,593 B1 | 11/2002 | Khosrowpour et al. | |
| 6,639,806 B1 * | 10/2003 | Chuang | G06F 1/184 361/748 |
| 7,024,494 B1 | 4/2006 | Pathan et al. | |
| 7,168,961 B2 * | 1/2007 | Hsieh | H01R 12/716 439/74 |
| 9,619,000 B2 * | 4/2017 | Itabashi | H04L 63/0442 |
| 9,974,161 B2 | 5/2018 | Wig et al. | |

(Continued)

FOREIGN PATENT DOCUMENTS

EP    1892632 A1   2/2008

*Primary Examiner* — Oscar C Jimenez
(74) *Attorney, Agent, or Firm* — Hewlett Packard Enterprise Patent Department

(57) ABSTRACT

One or more stacking cabled I/O slots may be installed in a stacked arrangement on a computing device, such as in an I/O expansion socket of a computing device motherboard. Slot detection and population logic associated with each of the one or more stacking cabled I/O slots enables signaling from each installed stacking cabled I/O slot, in order for its presence and location relative to any other installed stacking cabled I/O slot to be identified to and recognized by the computing device. High speed data signals through an installed stacking cabled I/O slot are coupled to the computing device via a cable, while power and logic signals are exchanged between the computing device and the one or more stacking cabled I/O slots via connections to the I/O expansion socket.

20 Claims, 13 Drawing Sheets

(56) References Cited

U.S. PATENT DOCUMENTS

| | | |
|---|---|---|
| 10,206,297 B2 | 2/2019 | Breakstone et al. |
| 2002/0072255 A1* | 6/2002 | Leman ................ H01R 12/721 |
| | | 439/61 |
| 2014/0017912 A1* | 1/2014 | Ha .......................... H05K 1/14 |
| | | 439/74 |
| 2016/0103472 A1* | 4/2016 | Schuette ................ G06F 1/187 |
| | | 361/679.33 |
| 2017/0357609 A1 | 12/2017 | Long et al. |

* cited by examiner

STACKING CABLED INPUT/OUTPUT SLOTS

BACKGROUND

Computing devices may be hardware-configurable to provide one or more input/output ("I/O") slots for attachment of a desired number of I/O devices. An I/O slot provides power to an attached I/O device as well as providing a high-speed data connection for communication between the computing device and the I/O device.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
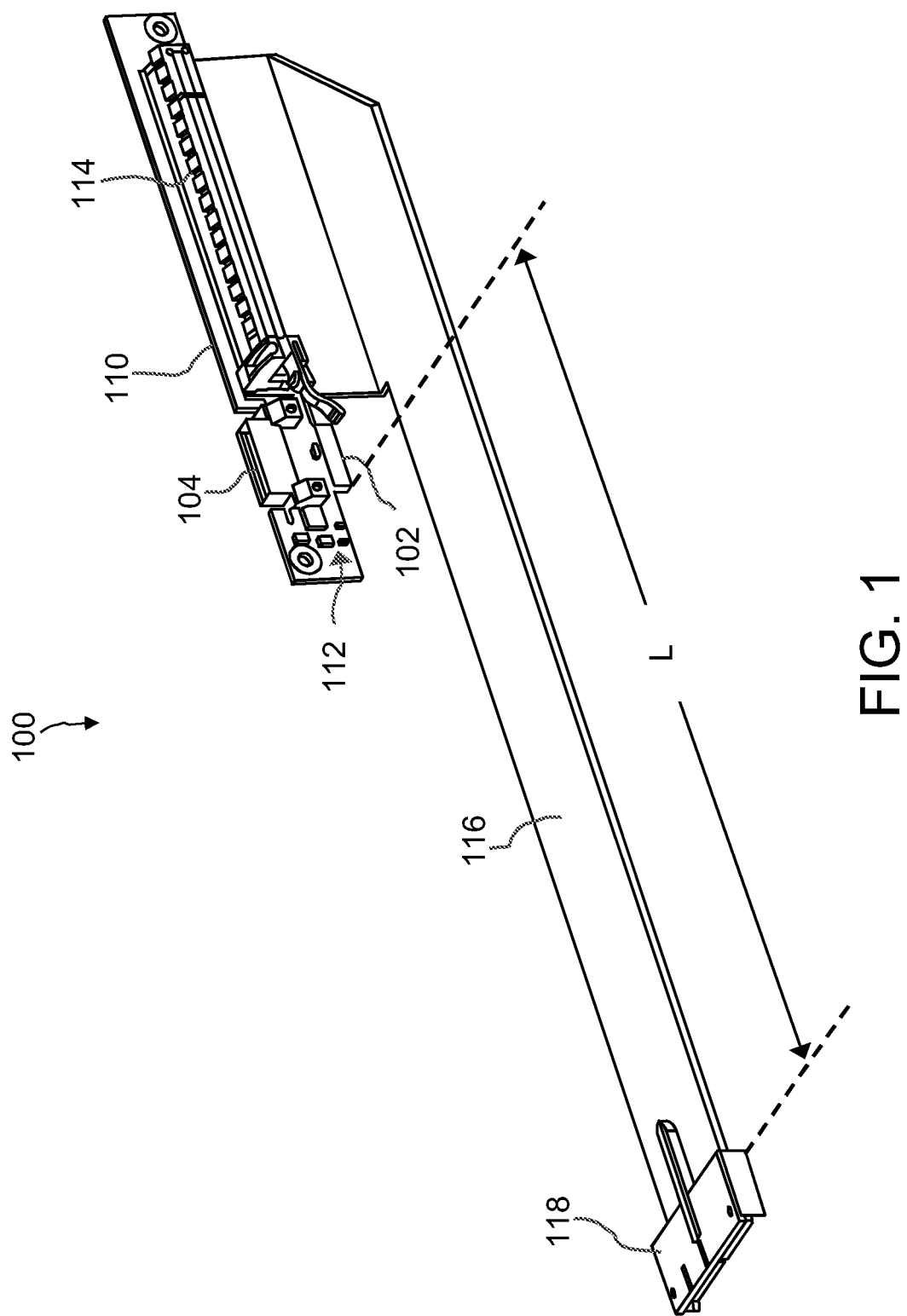
FIG. 1 is a front perspective view of a stacking cabled I/O slot according to one or more examples.

Illustrative examples of the subject matter claimed below will now be disclosed. In the interest of clarity, not all features of an actual implementation are described in this specification. It will be appreciated that in the development of any such actual implementation, numerous implementation-specific decisions may be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Further, as used herein, the article "a" is intended to have its ordinary meaning in the patent arts, namely "one or more." Herein, the term "about" when applied to a value generally means within the tolerance range of the equipment used to produce the value, or in some examples, means plus or minus 10%, or plus or minus 5%, or plus or minus 1%, unless otherwise expressly specified. Further, herein the term "substantially" as used herein means a majority, or almost all, or all, or an amount with a range of about 51% to about 100%, for example. Moreover, examples herein are intended to be illustrative only and are presented for discussion purposes and not by way of limitation.

As used herein, the term "input/output device" (or "I/O device") refers without limitation to any device adapted to communicate with a computing device such as a computing device including a computer motherboard. Examples of I/O devices include, without limitation, memory modules, hard drive or solid-state drives, network connection devices (e.g., WiFi or Ethernet cards), graphics processors, and the like.

As previously noted, a computing device, such as a computing module having a main motherboard carrying a processing unit and associated hardware, may be hardware-configurable to provide one or more I/O slots for attaching of one or more I/O devices to the computing device. For example, a computing device may be a storage array, storage device, storage enclosure, server, blade server, desktop or laptop, or any other device or equipment including a controller, a processing resource, or the like. The I/O slot hardware (or, simply, "I/O slot") distributes power to an attached I/O device and provides a connection for high-speed data communication between the computing device and the I/O device.

The physical location of an I/O slot relative to certain functional components of a computing device to which an I/O device is connected can impact the performance of the system. For example, when high-speed data signals are routed along conductive traces of a computing device motherboard, signal propagation delays may be introduced, sometimes necessitating the provision of re-timers and other circuitry to ensure adequate data throughput performance. On the other hand, when high-speed data signals are conducted by a cable which also carries power and other logic signals, electrical interference between the power signals and the data signals can arise. Moreover, providing power over flexible cables in a computing system can increase the possibility of inadvertent short-circuiting and can increase the cost and complexity of the connecting cables and associated cable connectors.

In examples described herein, a computing device may be hardware-configured with one or more stacking cabled I/O slots to accommodate attachment of one or more I/O devices to the computing device. Each of the one or more stacking cabled I/O slots is coupled, directly or indirectly, to the computing device, such as the computing device's motherboard, to receive power signals to be distributed to the one or more I/O devices, and is further coupled to the computing device to establish a high-speed data connection between the computing device and the one or more I/O devices.

In some examples herein, one or more stacking cabled I/O slots may be installed in a stacked, "daisy chained" arrangement on a computing device, with one or more stacking cabled I/O slots installed in an I/O expansion socket of a computing device motherboard. Slot allocation and population logic associated with each of the one or more stacking cabled I/O slots enables signaling from each installed stacking cabled I/O slot, in order for its presence and location relative to any other installed stacking cabled I/O slot to be identified to and recognized by the computing device. High speed data signals through an installed stacking cabled I/O slot are coupled to the computing device via a cable, while power and logic signals are exchanged between the computing device and the one or more stacking cabled I/O slots via connections to the I/O expansion socket.

Figure 2:
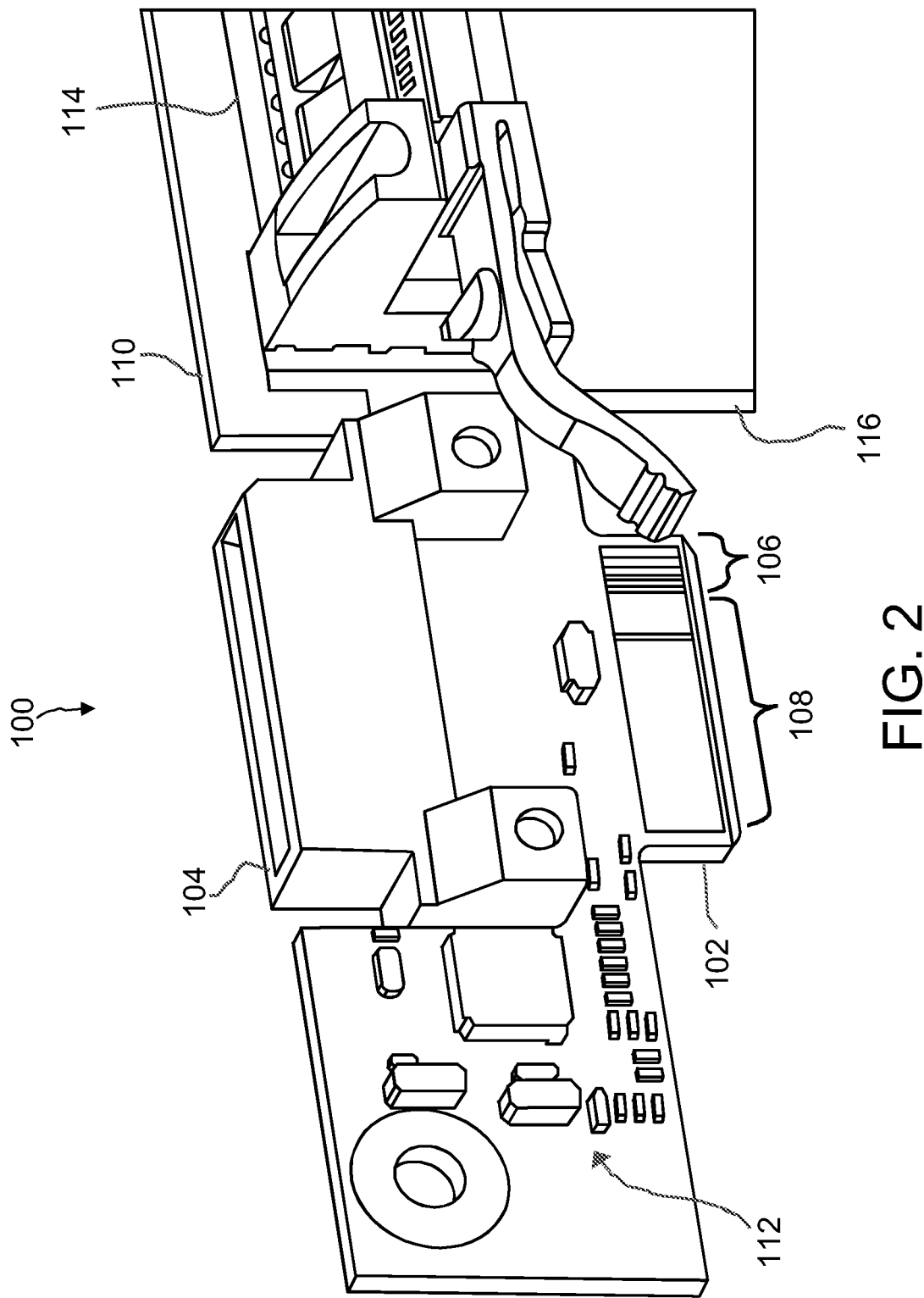
FIG. 2 is a partial front perspective view of the stacking cabled I/O slot of FIG. 1.
Figure 3:
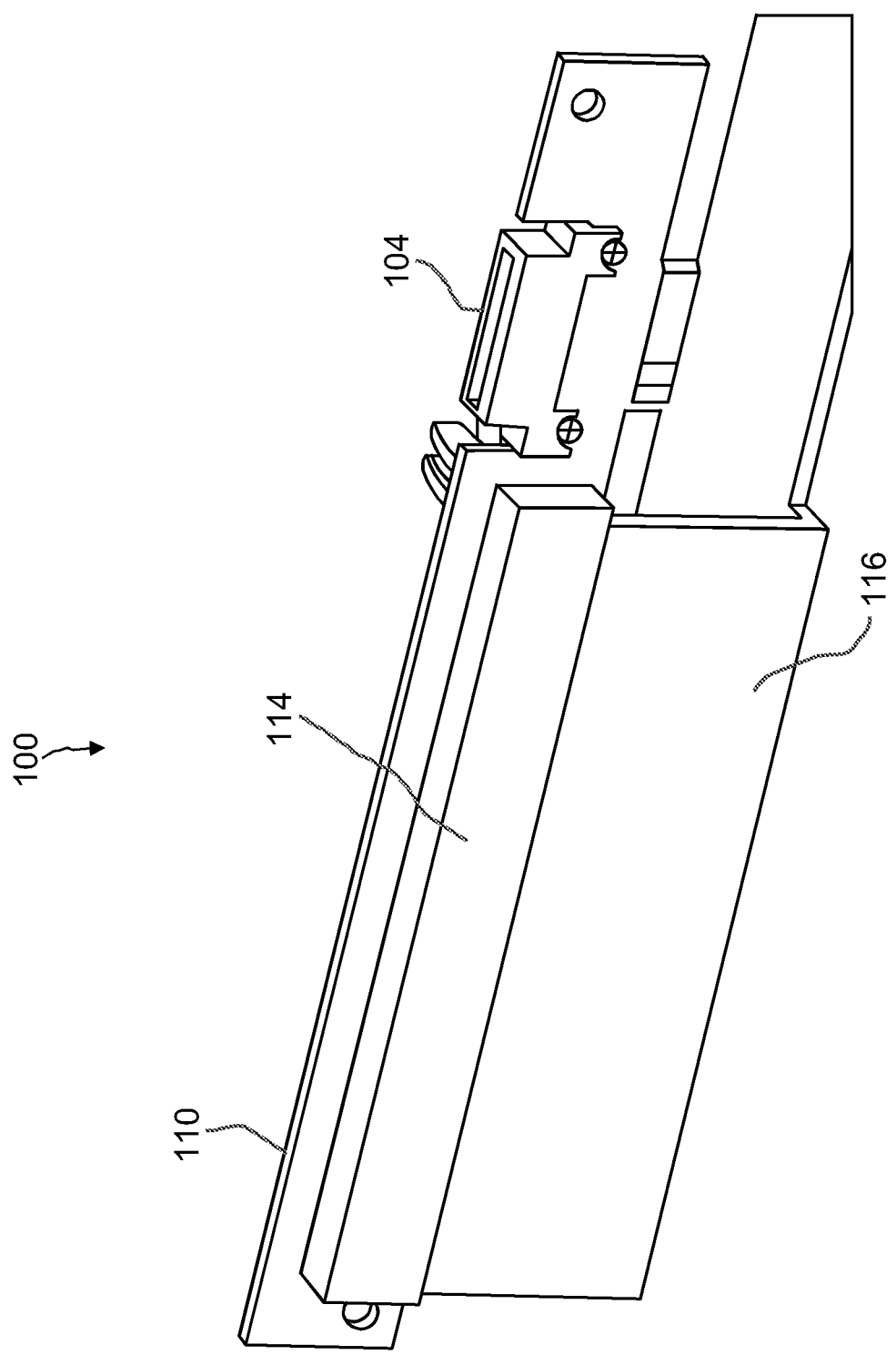
FIG. 3 is a partial rear perspective view of the stacking cabled I/O slot of FIG. 1.

FIG. 1 is a front perspective view of a stacking cabled I/O slot 100 according to one or more examples. FIG. 2 is a partial front perspective view of stacking cabled I/O slot 100. FIG. 3 is a partial rear perspective view of stacking cabled I/O slot 100. As shown in FIGS. 1-3, stacking cabled I/O slot 100 includes a first connector 102 and a second connector 104. In some examples, first connector 102 may be a male edge connector carrying one or more logic signal contacts 106 and one or more power contacts 108; second connector 104 may be a female edge connector having internal contacts corresponding to logic signal contacts 106 and power contacts 108 on first connector 102. In some examples, first connector 102 of stacking cabled I/O slot 100 is adapted to be connected to a receiving connector in an I/O expansion socket on a computing device, such as a motherboard (not shown in FIGS. 1-3), while second connector 104 of one stacking cabled I/O slot 100 is adapted to mate with a first connector 102 of a second stacking cabled I/O slot 100, as hereinafter described. That is, in addition to being adapted for mating with an I/O expansion socket, first connector 102 of a stacking cabled I/O slot may be adapted to mate with the second connector 104 of another stacking cabled I/O slot 100.

With continued reference to FIGS. 1-3, stacking cabled I/O slot 100 may include a main body 110, which may be, for example, a printed circuit assembly having circuitry 112 including slot allocation and population circuitry disposed thereon. Stacking cabled I/O slot 100 may further include an I/O device socket 114 disposed on main body 110. I/O device socket 114 is adapted to receive a mating connector of an external I/O device (not shown in FIG. 1). In addition, stacking cabled I/O slot 100 may include a cable 116 such as a ribbon cable coupled to I/O device socket 114. Cable 116 may be capable of communicating a plurality of high-speed data signals from an I/O device installed in I/O device socket 114 to a computing device. In particular, as shown in FIG. 1, cable 116 may be a ribbon cable including a cable connector 118 for connection of stacking cabled I/O slot 100 to a computing device, according to one or more examples described herein.

Figure 4:
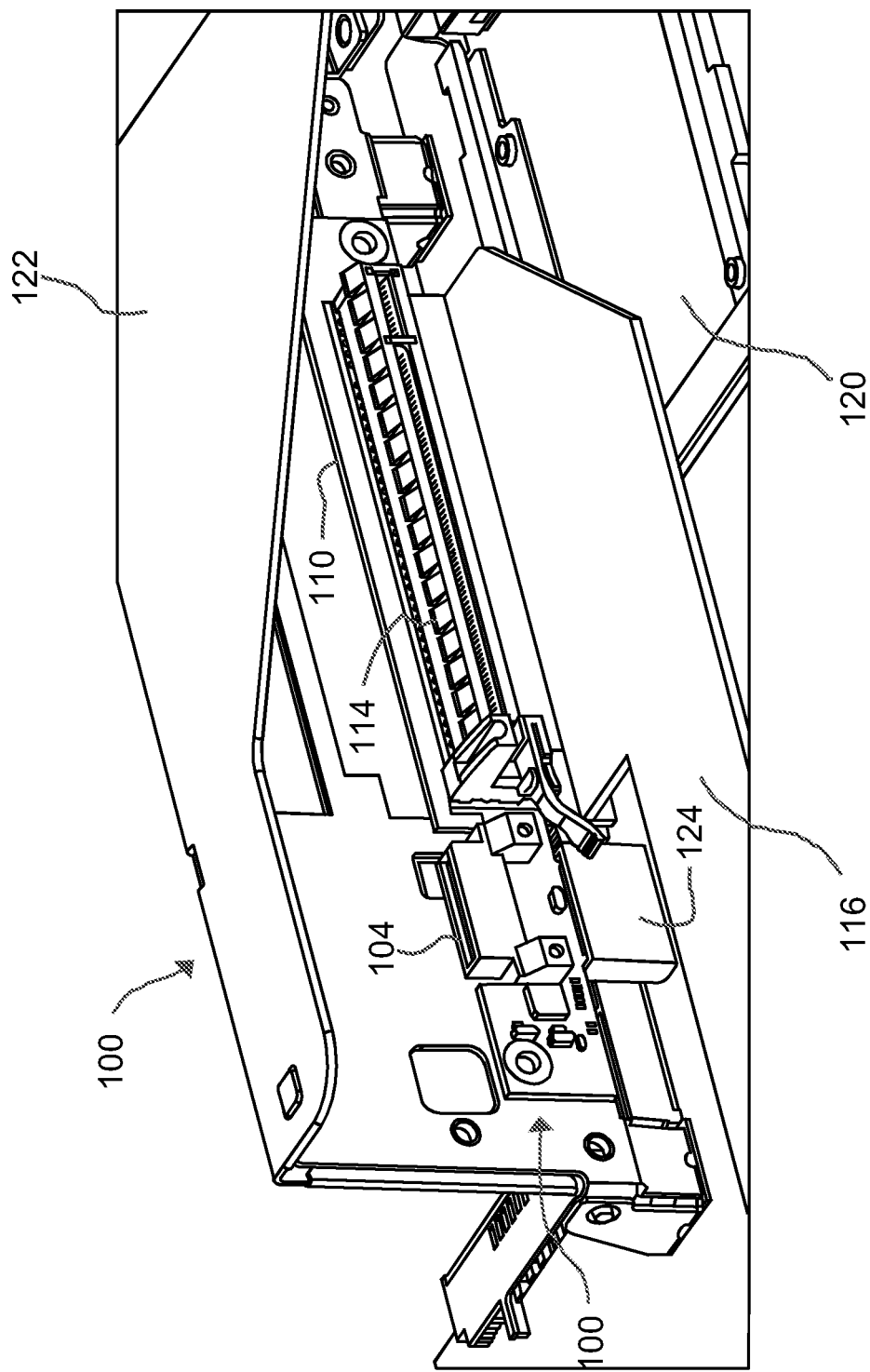
FIG. 4 is a partial front perspective view of the stacking cabled I/O slot of FIG. 1 installed on a computing device according to one or more examples.

Referring now to FIG. 4, there is shown a front perspective view of stacking cabled I/O slot 100 from the example of FIGS. 1-3 having been installed on a computing device comprising a motherboard 120 and an I/O slot carrier 122. As shown in FIG. 4, first connector 102 of stacking cabled I/O slot 100 is received within an I/O expansion socket 124 on motherboard 120. (First connector 102 is obscured from view by I/O expansion socket 124 in FIG. 4.) In some examples, this establishes power and logic signal connections between stacking cabled I/O slot 100 and motherboard 120 at the location of I/O expansion socket 124, via logic signal contacts 106 and power contacts 108 of first connector 102. In addition, high speed data signals coupled between I/O device socket 114 (such as from an installed I/O device, not shown) may be communicated via cable 116 and cable connector 118 to a different location on motherboard 120, such different location being located up to a spaced-apart distance L away from the location of first connector 102 and I/O expansion socket 124, the distance L being illustrated in FIG. 1. Such distance L may be of length that propagation of high-speed data signals on metal printed circuit board traces would necessitate re-timer or other circuitry to account for propagation delay. On the other hand, cable 116 can communicate such high-speed data signals without the need for compensating circuitry.

Figure 5:
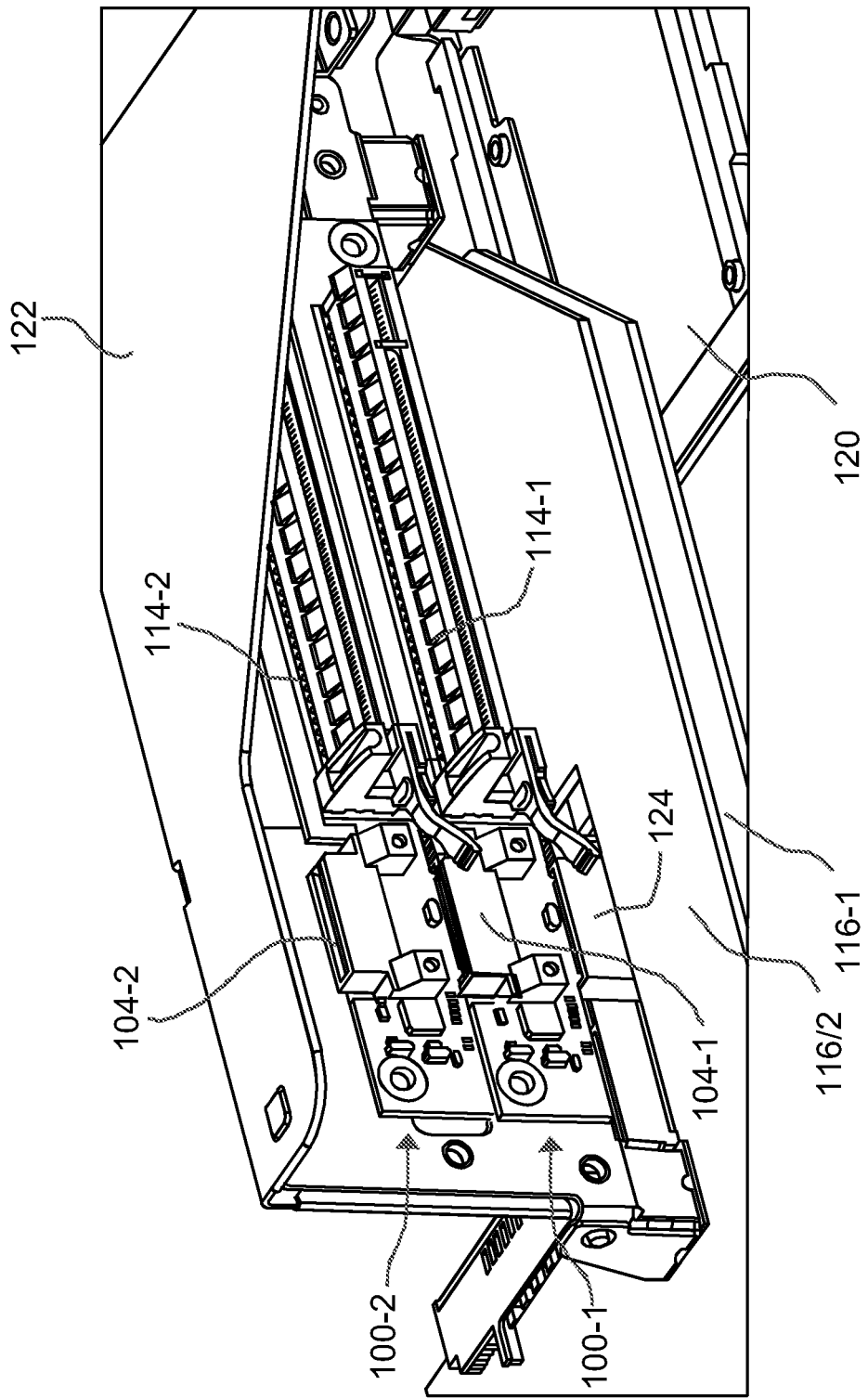
FIG. 5 is a partial front perspective view of two of the stacking cabled I/O slots of FIG. 1, installed on a computing device according to one or more examples.

Turning to FIG. 5, there is shown a front perspective view of an example with two stacking cabled I/O slots 100 (differentiated with reference numerals 100-1 and 100-2 in FIG. 5) having been installed on motherboard 120. In particular, stacking cabled I/O slot 100-1 is installed in I/O expansion socket 124 on motherboard 120 as shown in FIG. 4, while stacking cabled I/O slot 100-2 is installed in a stacked arrangement with stacking cabled I/O slot 100-1, with first connector 102-2 of stacking cabled I/O slot 100-2 being inserted into second connector 104-1 of stacking cabled I/O slot 100-1. (First connector 102-2 of stacking cabled I/O slot 100-2 is obscured from view in FIG. 5 by second connector 104-1 of stacking cabled I/O slot 100-1.) In some examples, this establishes power and logic signal connections between stacking cabled I/O slot 100-1 and stacking cabled I/O slot 100-2 and with motherboard 120. In addition, high-speed data signals coupled between I/O device socket 114-2 of stacking cabled I/O slot 100-2 (such as from another installed I/O device, not shown) may be communicated via cable 116-2 and a cable connector 118-2 thereon (not shown in FIG. 5) to a spaced-apart location on motherboard 120, such different location being up to a distance L away from the location of first connector 102-1 and I/O expansion socket 124, the distance L being shown in FIG. 1.

Figure 6:
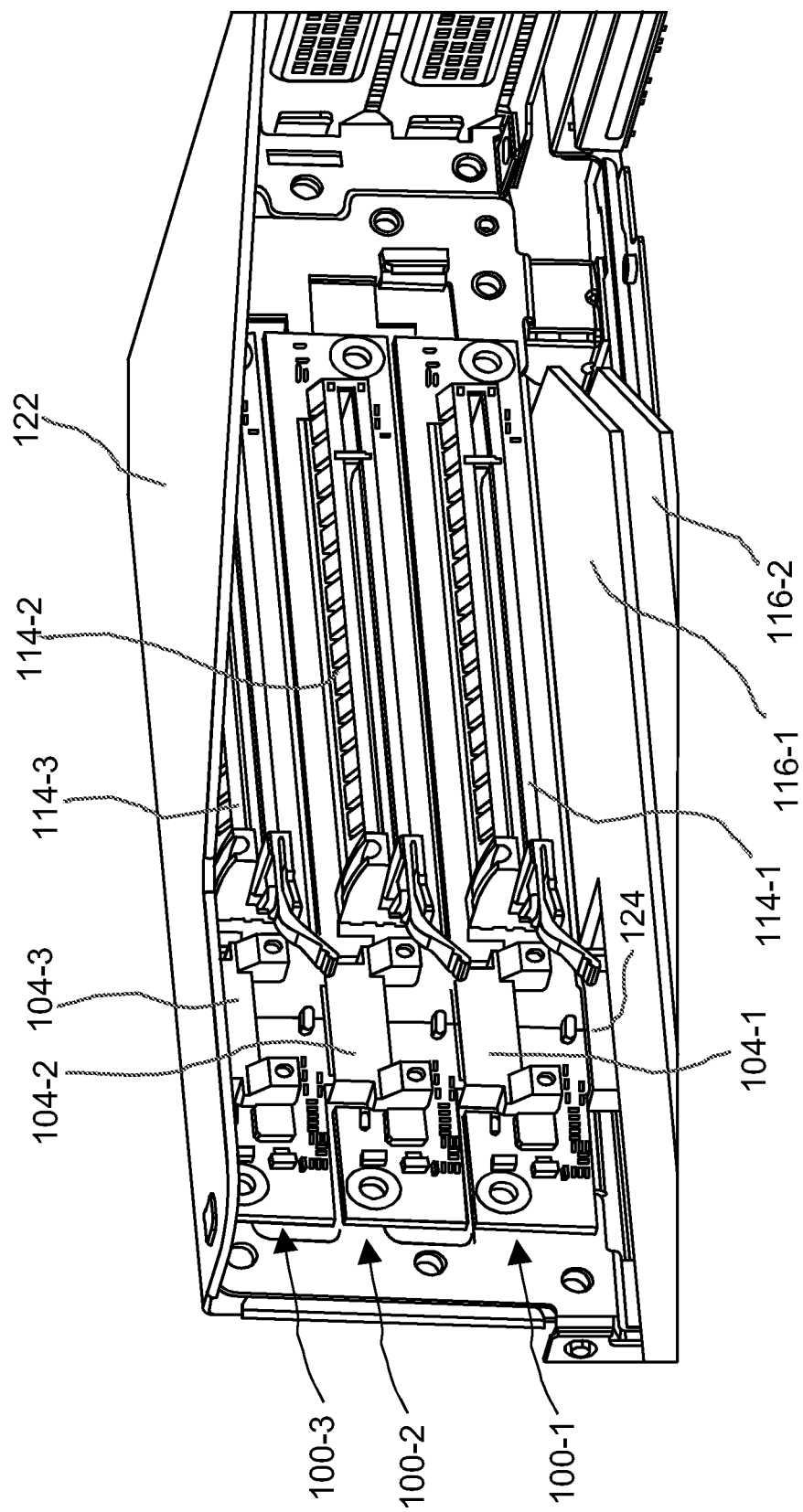
FIG. 6 is a partial front perspective view of three of the stacking cabled I/O slots of FIG. 1, installed on a computing device according to one or more examples.

Turning to FIG. 6, there is shown a front perspective view of an example with three stacking cabled I/O slots 100 (differentiated with reference numerals 100-1, 100-2, and 100-3 in FIG. 6) having been installed on motherboard 120. In particular, stacking cabled I/O slot 100-1 is installed in I/O expansion socket 124 on motherboard 120 as shown in FIGS. 4 and 5, while stacking cabled I/O slot 100-2 is installed in a stacked arrangement with stacking cabled I/O slot 100-1, with first connector 102-2 of stacking cabled I/O slot 100-2 being inserted into second connector 104-1 of stacking cabled I/O slot 100-1, as shown in FIG. 5. (First connector 102-2 of stacking cabled I/O slot 100-2 is obscured from view in FIG. 6 by second connector 104-1 of stacking cabled I/O slot 100-1.)

Additionally, in FIG. 6, stacking cabled I/O slot 100-3 is installed in a stacked arrangement with stacking cabled I/O slot 100-2 and stacking cabled I/O slot 100-1, with first connector 102-3 of stacking cabled I/O slot 100-3 being inserted into second connector 104-2 of stacking cabled I/O slot 100-2, as shown in FIG. 5. (First connector 102-3 of stacking cabled I/O slot 100-3 is obscured from view in FIG. 6 by second connector 104-2 of stacking cabled I/O slot 100-2.) In some examples, this establishes power and logic signal connections between stacking cabled I/O slots 100-1, 100-2, and 100-3 and with motherboard 120. In addition, high-speed data signals coupled between I/O device socket 114-3 of stacking cabled I/O slot 100-3 (such as from another installed I/O device, not shown) may be communicated via cable 116-3 (not shown in FIG. 6) and a cable connector 118-3 thereon (also not shown in FIG. 6) to a spaced-apart location on motherboard 120.

In some examples, slot allocation and population circuitry 112 on a stackable I/O slot such as stacking cabled I/O slot 100 from the example of FIGS. 1-6 operates to identify the presence and location of one or more stacking cabled I/O slots installed on a motherboard such as motherboard 120 in the examples of FIGS. 4-6.

Figure 7:
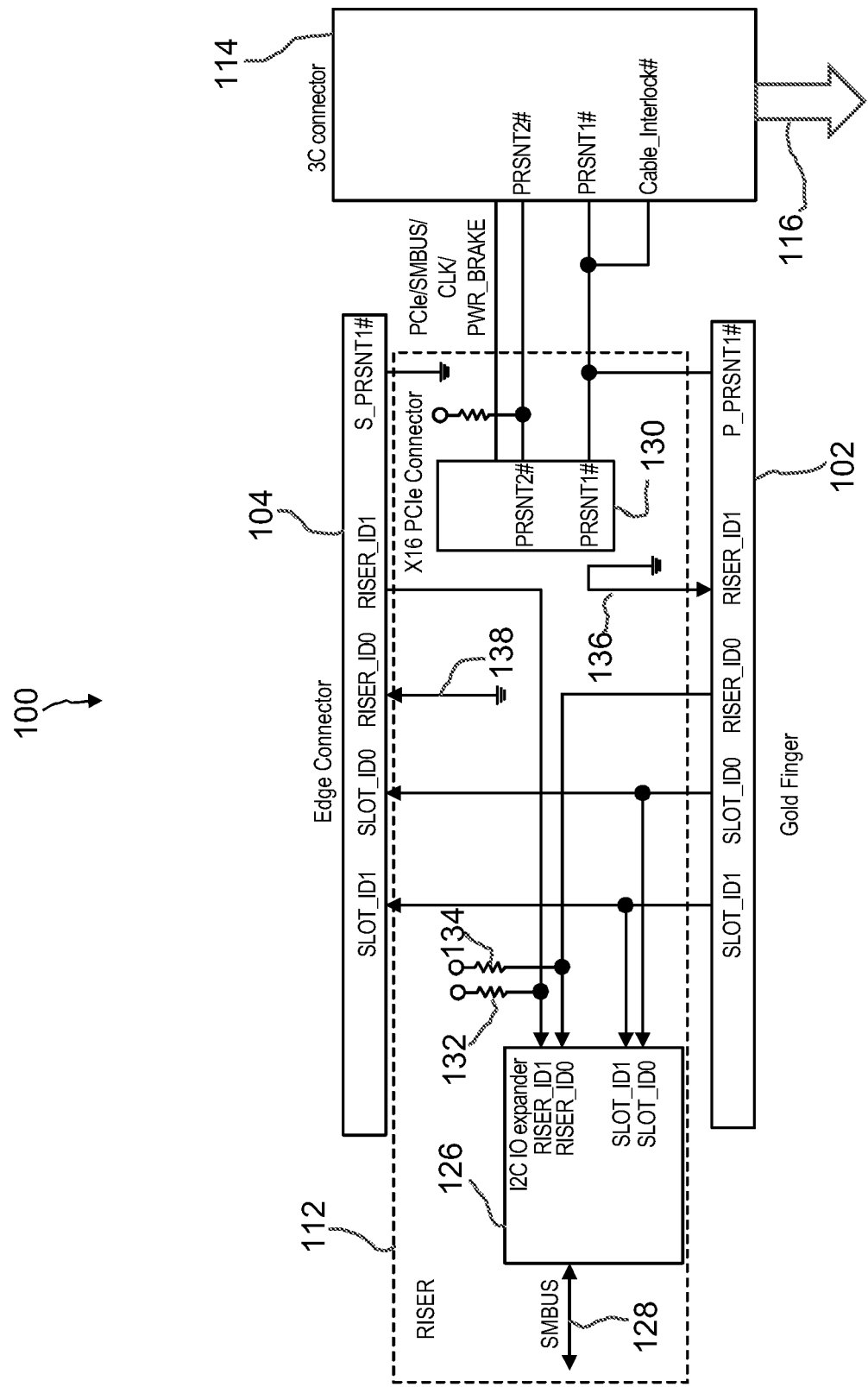
FIG. 7 is a schematic diagram of a slot detection and population circuit for a stacking cabled I/O slot according to one or more examples.

FIG. 7 is a schematic diagram of stacking cabled I/O slot 100, including slot allocation and population circuitry 112. As shown in FIG. 7, slot allocation and population circuitry 112 is interposed between first connector 102 and second connector 104 of stacking cabled I/O slot 100, and receives and drives logic signals via first connector 102 and second connector 104 to provide slot allocation and population information identifying the presence and ordering of one or more stacking cabled I/O slots on a motherboard such as motherboard 120 in the example of FIGS. 4-6.

In some examples, slot allocation and population circuitry 112 operates to provide slot allocation and population signals to an inter-integrated circuit ("I2C") interface 126 coupled to a system management bus ("SMBUS") connection 128. In some examples, SMBUS connection 128 is coupled to system management circuitry on motherboard 120 via cable 116. SMBUS connection 128 provides for signaling from an installed stacking cabled I/O slot to a computing device on which stacking cabled I/O slot 100 is installed. Such signaling enables a computing device to identify the presence of the installed stacking cabled I/O slot and its position relative to any other stacking cabled I/O slots which may be installed.

In particular, as shown in FIG. 7, a plurality of logic signals are driven or received at both first connector 102 and second connector 104, and provided to I2C interface 126, including the following signals:
  LOCATION_ID0
  LOCATION_ID1
  RISER_ID0
  RISER_ID1

In addition, a connector circuit 130 on motherboard 120 is coupled to a P_PRSNT1 #terminal of first connector 102 and to an S_PRSNT1 #terminal of second connector 104. In some examples, connector circuit 130 may be a Peripheral Component Interconnect Express ("PCIe") connector circuit compatible with the PCIe high-speed I/O bus standard. In some examples, connector circuit 130 may be connected to stacking cabled I/O slot 100 via cable 116.

In some examples, the logic values of the signals generated and driven by slot allocation population and order circuitry 112 are presented at SMBUS connection 128 according to the following Tables 1 and 2:

TABLE 1

| RISER LOCATION | LOCATION_ID1 | LOCATION_ID0 |
|---|---|---|
| PRIMARY | 0 | 0 |
| SECONDARY | 0 | 1 |
| TERTIARY | 1 | 0 |
| QUATERNARY | 1 | 1 |

TABLE 2

| SLOT PRESENT IN THE GROUP | RISER ORDER# | RISER_ID1 | RISER_ID0 |
|---|---|---|---|
| 1 SLOTS | RISER_ORDER_1 | 1 | 1 |
| 2 SLOTS | RISER_ORDER_1 | 0 | 1 |
|  | RISER_ORDER_2 | 1 | 0 |
| 3 SLOTS | RISER_ORDER_1 | 0 | 1 |
|  | RISER_ORDER_2 | 0 | 0 |
|  | RISER_ORDER_3 | 1 | 0 |

The values of LOCATION_ID0 and LOCATION_ID1 are strapped on motherboard 120 to indicate the numbers of stacking cabled 10 slot groups are designed and supported in the server. As shown in Table 1, a rack server can support up to four groups, Primary, Secondary, Tertiary and Quaternary. In one example each group can have up to three stacking cabled 10 slots 100, total of twelve slots in the system. More stacking cabled 10 slots may be supported by increasing the number of LOCATION_ID bits. A system with three LOCATION_ID can support up to twenty-four slots.

The values of the RISER_ID0 and RISER_ID1 signals as shown in Table 1 result from the presence of pull-up circuits 132 and 134 applied to RISER_ID1 and RISER_ID0 inputs, respectively, of I2C interface 126, as well as the ground connection 136 to the RISER_ID1 terminal of first connector 102 and the ground connection 138 to the RISER_ID1 terminal of second connector 104, as shown in FIG. 7. The numbers of stacking cabled 10 slots 100 presented in a specific group (Primary, Secondary, Tertiary, or Quaternary) can be determined via communication over SMBUS 128 to I2C interface 125 giving that Cable_Interlock #signal is asserted by coupling to P_PRSNT1 #terminal of first connector 102 and/or to an S_PRSNT1 #terminal of second or third connectors 104. Once numbers of stacking cabled 10 slots of specific group are known, the order of stacking cabled 10 slot (RISER_ORDER #) is automatically assigned based on RISER_ID0 and RISER_ID1 values listed in Table 2. The results are used by system firmware to associate what adapters are installed (via PRSNT2 #signal assertion) in which stacking cabled 10 slots 100. This information is a component of server management error logging and reporting architecture.

Figure 8:
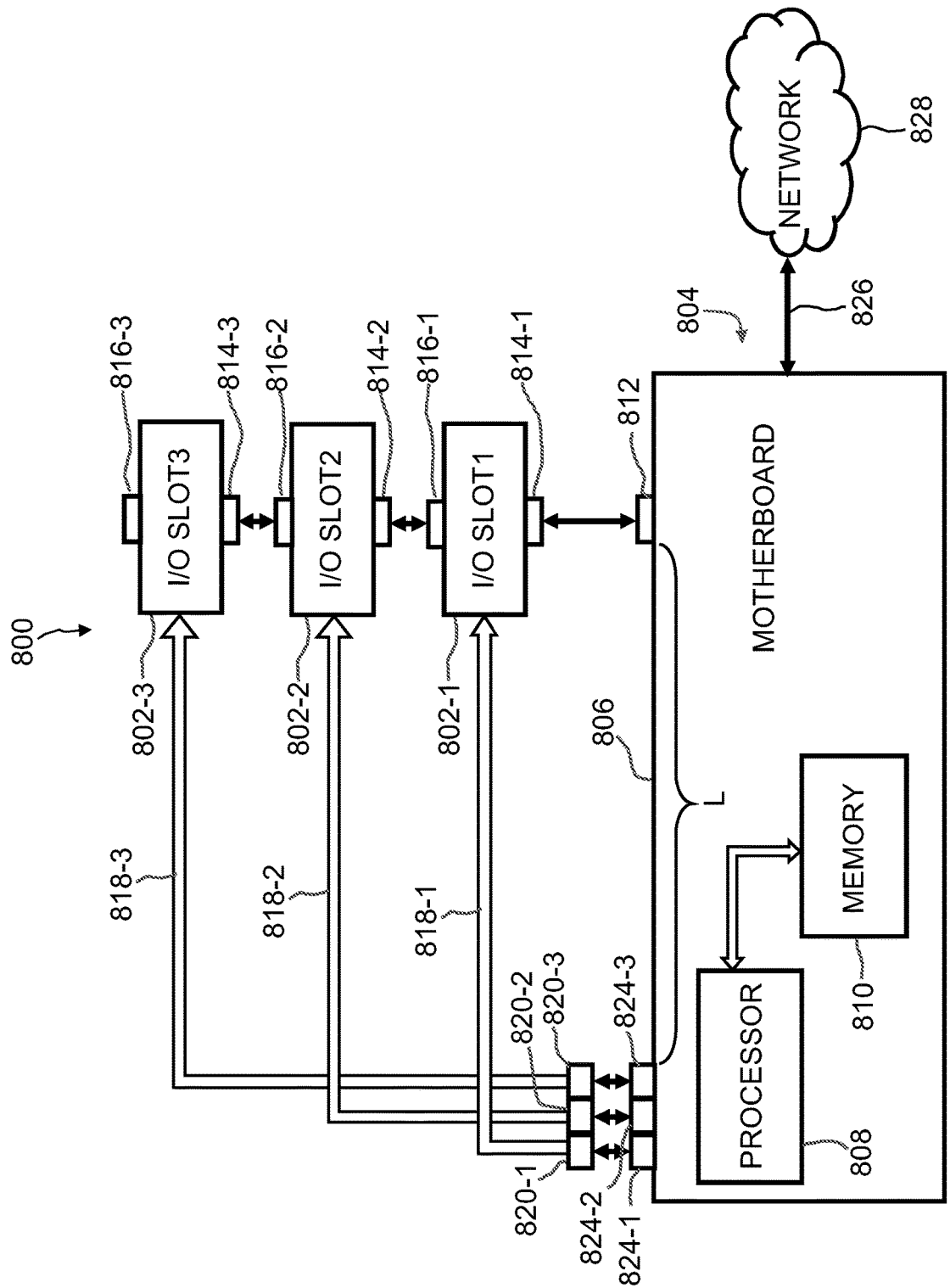
FIG. 8 is a block diagram of a computing device having a plurality of stacking cabled I/O slots installed thereon according to one or more examples.

Referring to FIG. 8, there is shown a block diagram of a computing device system 800 incorporating a plurality of stacking cabled I/O slots 802-1, 802-2, 802-3 according to one or more examples. Computing device system 800 includes a computing device 804 including a motherboard 806 supporting a processor 808 coupled to at least one memory unit 810. Memory unit 810 may be any one or more forms of data storage media, including without limitation, dynamic random-access memory ("DRAM"), static random access memory ("SRAM"), read-only memory ("ROM"), flash memory, and the like used to store data and programs of instructions for controlling operation of processor 808.

Motherboard 806 further includes an I/O expansion socket 812 to facilitate installation of one or more I/O slots and to provide a logic and power interface between stacking cabled I/O slots 802-1, 802-2, and 802-3 and computing device 804. With continued reference to FIG. 8, stacking cabled I/O slot 802-1 includes a first connector 814-1 and a second connector 816-1. As in the example of FIGS. 1-3, first connector 814-1 may be a male edge connector having a plurality of electrical signal contacts, including, in some examples, power contacts and logic signal contacts, while second connector 816-2 may be a female edge connector compatible with a male edge connector such as first connector 814-1. First connector 814-1 may be compatible with I/O expansion socket 812. Similarly, stacking cabled I/O slot 802-2 includes a first connector 814-2 and a second connector 816-2, and stacking cabled I/O slot 802-3 includes a first connector 814-3 and a second connector 816-3. The first connectors 814-1, 814-2, and 814-3 of respective stacking cabled I/O slots 802-1, 802-2, and 802-3 are each adapted to mate either directly with I/O expansion socket 812, or with a second connector 816-1, 816-2, or 816-3 of another stacking cabled I/O slot 802-1, 802-2, or 802-3.

With this arrangement, power and logic signals, including some logic signals exchanged with processor 808 on motherboard 806, are communicated from I/O expansion socket 812 first to stacking cabled I/O slot 802-1, then further propagating sequentially in a daisy-chain fashion through stacking cabled I/O slots 802-3 and 802-3. Certain logic signals may be subject to modification as they propagate through sequential stacking cabled I/O slots 802-1, 802-2, and 802-3. Power signals supplied from I/O expansion socket 812 may be supplied directly to each stacking cabled I/O slot 802-1, 802-2, and 802-3 via power contacts in first and second connectors 814-1, 814-2, 814-3 and 816-1, 816-2, and 816-3 of stacking cabled I/O slots 802-1, 802-2, and 802-3.

Each stacking cabled I/O slot 802-1, 802-2, 802-3 has a respective cable 818-1, 818-2, 818-3 terminating with a respective cable connector 820-1, 820-2, 820-3. Cable connectors 820-1, 820-2, and 820-3 are adapted to connect to respective mating cable connectors 824-1, 824-2, and 824-3 provided at a location on motherboard 806. In some examples the location of cable connectors 824-1, 824-2, and 824-3 is nearer to the location of processor 808 and memory unit 810 than the location of I/O expansion socket 812. In FIG. 8, I/O expansion socket 812 is at least a distance L away from cable connectors 824-1, 824-2, and 824-3.

Cables 818-1, 818-2, and 818-3 may communicate high-speed data signals between respective stacking cabled I/O slots 802-1, 802-2, and 802-3 and a region of motherboard 806 which may be physically closer to such circuit elements as processor 808 and memory unit 810 than the location of I/O expansion socket 812. In some examples, cables 818-1, 818-2, and 818-3 may be ribbon cables. This reduces or eliminates the propagation delay of such high-speed data signals that may be introduced in having such signals conducted on motherboard 806. As noted above, such propagation delays may necessitate the provision of re-timers and other compensating circuitry to ensure adequate throughput performance associated with I/O devices.

Moreover, since power signals are provided to stacking cabled I/O slots 802-1, 802-2, and 802-3 through I/O expansion socket 812, no power is conducted in parallel with the high-speed data on cables 818-1, 818-2, and 818-3, thus reducing risks of electrical (e.g., capacitive) interference with such high-speed data signals, and reducing the risk of voltage shorts occurring along cables 818-1, 818-2, and 818-3.

As previously described, in addition to high-speed data, cables 818-1, 818-2, and 818-3 may carry system management bus ("SMBUS") signals providing information to circuitry on motherboard 806 about the presence and relative positioning of stacking cabled I/O slots 802-1, 802-2, and 802-3 installed in computing device system 800. In some examples, this SMBUS information may take the form of the RISER_ID1/RISER_ID0 and LOCATION_ID1/LOCATION_ID0 signals previously described with reference to FIG. 7. With a slot allocation and population circuit 112 such as described with reference to FIG. 7, the presence and relative stacked position of one or more stacking cabled I/O slots such as 802-1, 802-2, 802-3 may be identified to circuitry on motherboard 806.

With continued reference to FIG. 8, computing device 804 may be coupled via a network connection 826 to a network 828, which may be, in some examples, a local area network (LAN), wide-area network (WAN), or the Internet.

Figure 9:
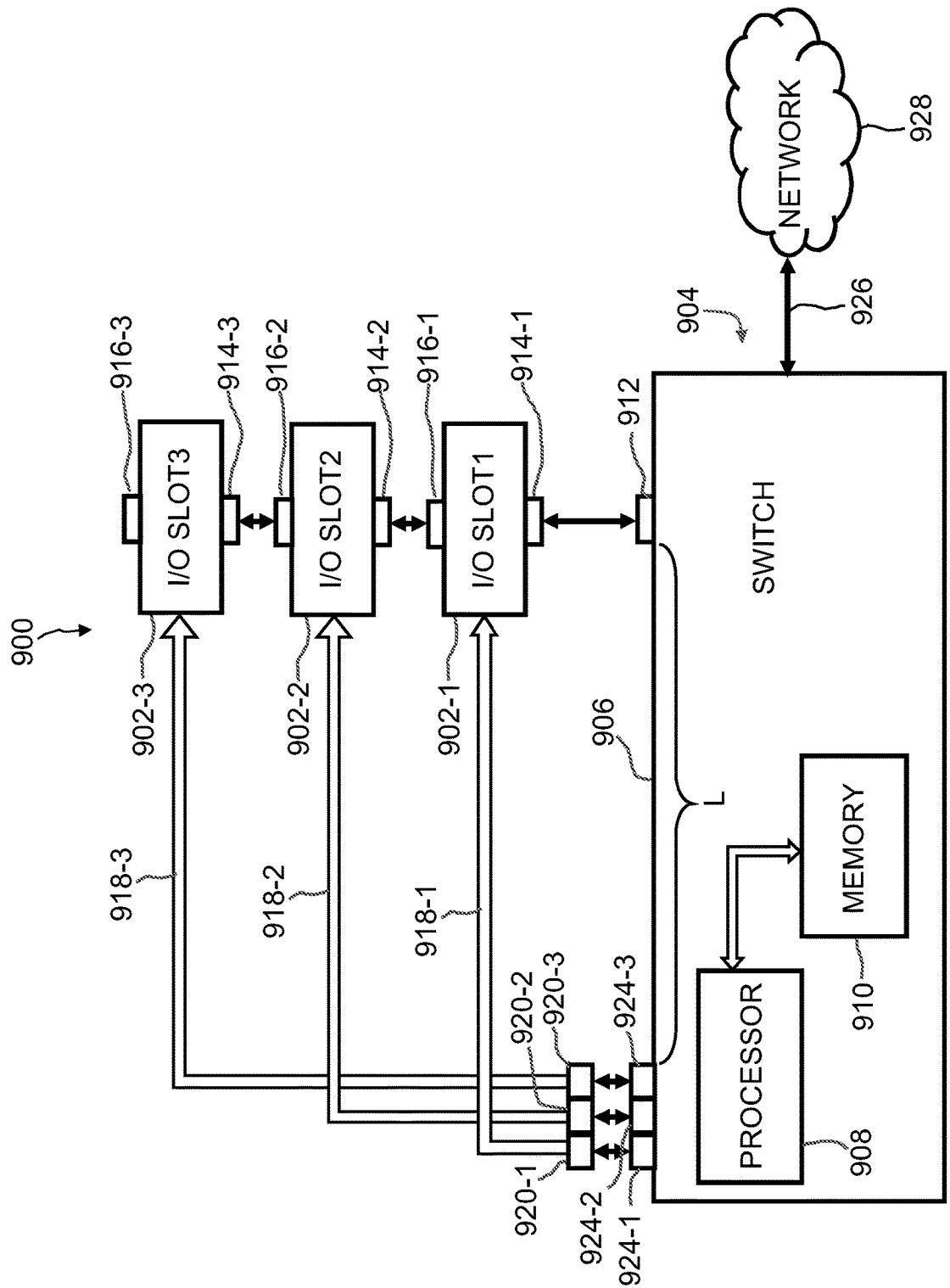
FIG. 9 is a block diagram of a switch having a plurality of stacking cabled I/O slots installed thereon according to one or more examples.

Turning to FIG. 9, there is shown a block diagram of a computing device system 900 incorporating a plurality of stacking cabled I/O slots 902-1, 902-2, 902-3 according to one or more examples. In this example, computing device system 900 includes a switch 904 including a motherboard 906 supporting a processor 908 coupled to at least one memory unit 910. Memory unit 910 may be any one or more forms of data storage media, including without limitation, dynamic random-access memory ("DRAM"), static random access memory ("SRAM"), read-only memory ("ROM"), flash memory, and the like used to store data and programs of instructions for controlling operation of processor 908.

Motherboard 906 further includes an I/O expansion socket 912 to facilitate installation of one or more I/O slots and to provide a logic and power interface between stacking cabled I/O slots 902-1, 902-2, and 902-3 and switch 904. With continued reference to FIG. 9, stacking cabled I/O slot 902-1 includes a first connector 914-1 and a second connector 916-1. As in the example of FIGS. 1-3, first connector 914-1 may be a male edge connector having a plurality of electrical signal contacts, including, in some examples, power contacts and logic signal contacts, while second connector 916-2 may be a female edge connector compatible with a male edge connector such as first connector 914-1. First connector 914-1 may be compatible with I/O expansion socket 912. Similarly, stacking cabled I/O slot 902-2 includes a first connector 914-2 and a second connector 916-2, and stacking cabled I/O slot 902-3 includes a first connector 914-3 and a second connector 916-3. The first connectors 914-1, 914-2, and 914-3 of respective stacking cabled I/O slots 902-1, 902-2, and 902-3 are each adapted to mate either directly with I/O expansion socket 912, or with a second connector 916-1, 916-2, or 916-3 of another stacking cabled I/O slot 902-1, 902-2, or 902-3.

With this arrangement, power and logic signals, including some logic signals exchanged with processor 908 on motherboard 906, are communicated from I/O expansion socket 912 first to stacking cabled I/O slot 902-1, then further propagating sequentially in a daisy-chain fashion through stacking cabled I/O slots 902-3 and 902-3. Certain logic signals may be subject to modification as they propagate through sequential stacking cabled I/O slots 902-1, 902-2, and 902-3. Power signals supplied from I/O expansion socket 912 may be supplied directly to each stacking cabled I/O slot 902-1, 902-2, and 902-3 via power contacts in first and second connectors 914-1, 914-2, 914-3 and 916-1, 916-2, and 916-3 of stacking cabled I/O slots 902-1, 902-2, and 902-3.

Each stacking cabled I/O slot 902-1, 902-2, 902-3 has a respective cable 918-1, 918-2, 918-3 terminating with a respective cable connector 920-1, 920-2, 920-3. Cable connectors 920-1, 920-2, and 920-3 are adapted to connect to respective mating cable connectors 924-1, 924-2, and 924-3 provided at a location on motherboard 906. In some examples the location of cable connectors 924-1, 924-2, and 924-3 is nearer to the location of processor 908 and memory unit 910 than the location of I/O expansion socket 912. In FIG. 9, I/O expansion socket 912 is at least a distance L away from cable connectors 924-1, 924-2, and 924-3.

Cables 918-1, 918-2, and 918-3 may communicate high-speed data signals between respective stacking cabled I/O slots 902-1, 902-2, and 902-3 and a region of motherboard 906 which may be physically closer to such circuit elements as processor 908 and memory unit 910 than the location of I/O expansion socket 912. In some examples, cables 918-1, 918-2, and 918-3 may be ribbon cables. This reduces or eliminates the propagation delay of such high-speed data signals that may be introduced in having such signals conducted on motherboard 906. As noted above, such propagation delays may necessitate the provision of re-timers and other compensating circuitry to ensure adequate throughput performance associated with I/O devices.

Moreover, since power signals are provided to stacking cabled I/O slots 902-1, 902-2, and 902-3 through I/O expansion socket 912, no power is conducted in parallel with the high-speed data on cables 918-1, 918-2, and 918-3, thus reducing risks of electrical (e.g., capacitive) interference with such high-speed data signals, and reducing the risk of voltage shorts occurring along cables 918-1, 918-2, and 918-3.

As previously described, in addition to high-speed data, cables 918-1, 918-2, and 918-3 may carry system management bus ("SMBUS") signals providing information to circuitry on motherboard 906 about the presence and relative positioning of stacking cabled I/O slots 902-1, 902-2, and 902-3 installed in computing device system 900. In some examples, this SMBUS information may take the form of the RISER_ID1/RISER_ID0 and LOCATION_ID1/LOCATION_ID0 signals previously described with reference to FIG. 7. With a slot allocation and population circuit 112 such as described with reference to FIG. 7, the presence and relative stacked position of one or more stacking cabled I/O slots such as 902-1, 902-2, 902-3 may be identified to circuitry on motherboard 906.

With continued reference to FIG. 9, switch 804 may be coupled via a network connection 926 to a network 928, which may be, in some examples, a local area network (LAN), wide-area network (WAN), or the Internet.

Figure 10:
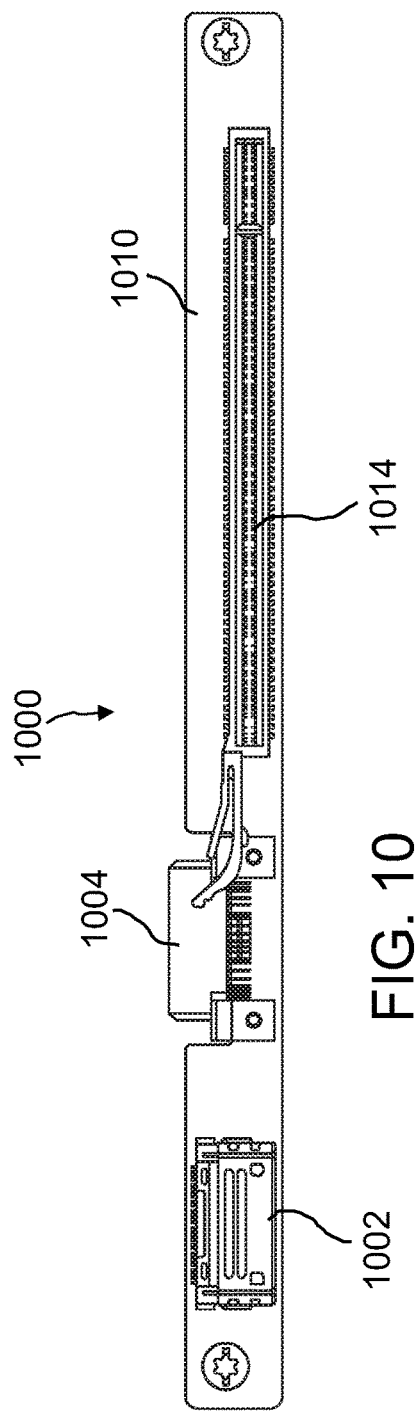
FIG. 10 is a front view of a free height riser I/O slot according to one or more examples.
Figure 11:
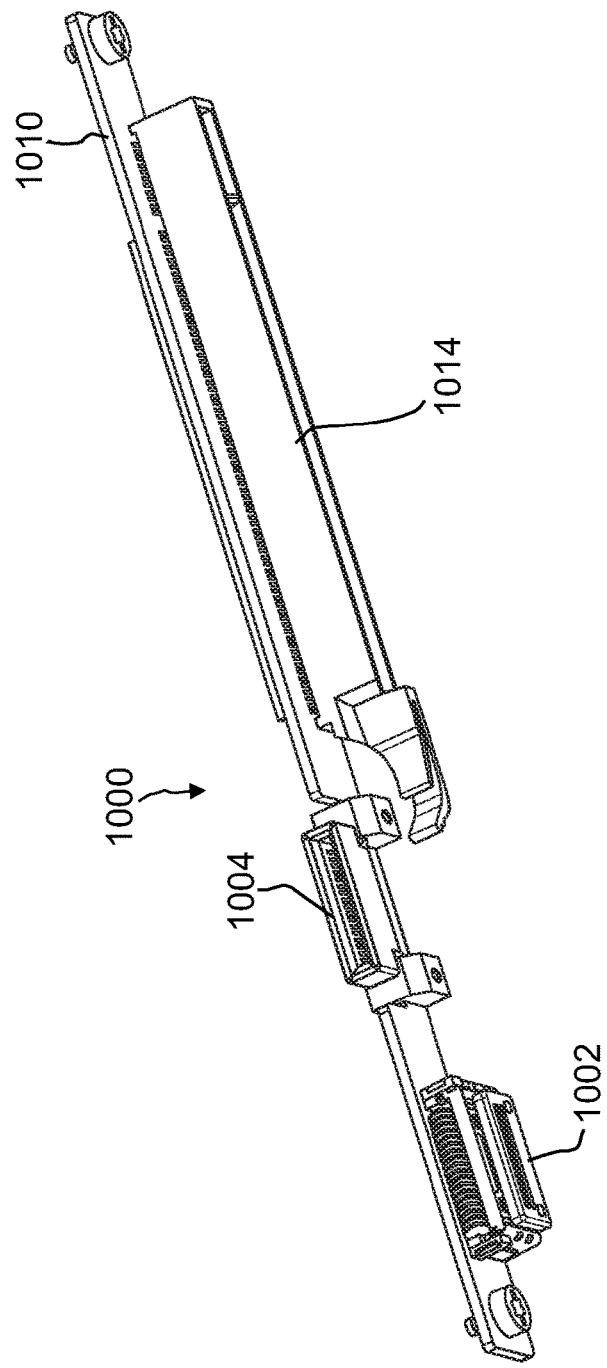
FIG. 11 is a perspective view of the free height riser I/O of FIG. 10.

Turning to FIGS. 10 and 11, there is shown a free height riser I/O slot 1000 according to one or more examples. Free height riser I/O slot is adapted to serve as a first I/O slot among a plurality of stacking I/O slots which is not coupled by means of an edge connection to a motherboard, but rather to accommodate the presence of another component between the plurality of stacking I/O slots and a motherboard.

FIG. 10, is a front view of free height riser I/O slot 1000 according to one or more examples. FIG. 11 is a perspective view of free height riser I/O slot 1000. As shown in FIGS. 10 and 11, free height riser I/O slot 1000 includes a connector 1002 for establishing a direct or cabled connection between free height riser I/O slot 1000 and a computing device, such as a motherboard. In particular, connector may provide a connection for both the power and logic signals carried on first connector 102 from the stacking cabled I/O slot 100 from the example of FIG. 1, as well as high-speed data signals from an attached I/O device, as hereinafter described. A cable or other connector (not shown in FIGS. 10 and 11) may carry such power and logic signals and high speed data signals to a computing device, as hereinafter described.

As shown in FIGS. 10 and 11, free height riser I/O slot 1000 further includes a second connector 1004 corresponding to second connector 104 from a stacking I/O slot such as stacking cabled I/O slot 100 from the example of FIG. 1, adapted to receive a first slot from an additional instance of a stacking I/O slot such as stacking cabled I/O slot 100 from the example of FIG. 1. In this manner, free height riser I/O slot 1000 may be substituted for a first stacking I/O slot in a stack of I/O slots such as depicted in the examples of FIGS. 5 and 6. With the provision of a connector 1002, such a stack including free height riser I/O slot 1000 and one or more additional stacking cabled I/O slots 100 may be installed atop a component, such as a power supply unit (PSU) disposed on a motherboard, as hereinafter described.

In some examples, second connector 1004 may be a female edge connector having internal contacts corresponding to logic signal contacts 106 and power contacts 108 on a first connector 102 of stacking cabled I/O slot 100 from the example of FIG. 1.

With continued reference to FIGS. 10 and 11, free height riser I/O slot 1000 may include a main body 1010, which may be, for example, a printed circuit assembly having circuitry (not shown) including slot allocation and population circuitry disposed thereon. Free height riser I/O slot 1000 may further include an I/O device socket 1014 disposed on main body 1010. I/O device socket 1014 is adapted to receive a mating connector of an external I/O device (not shown in FIGS. 10 and 11). A cable or other hardware connector (not shown in FIGS. 10 and 11) coupled to connector 1002 may be capable of communicating a both power and logic signals as well as a plurality of high-speed data signals from an I/O device installed in I/O device socket 1014 to a computing device.

Figure 12:
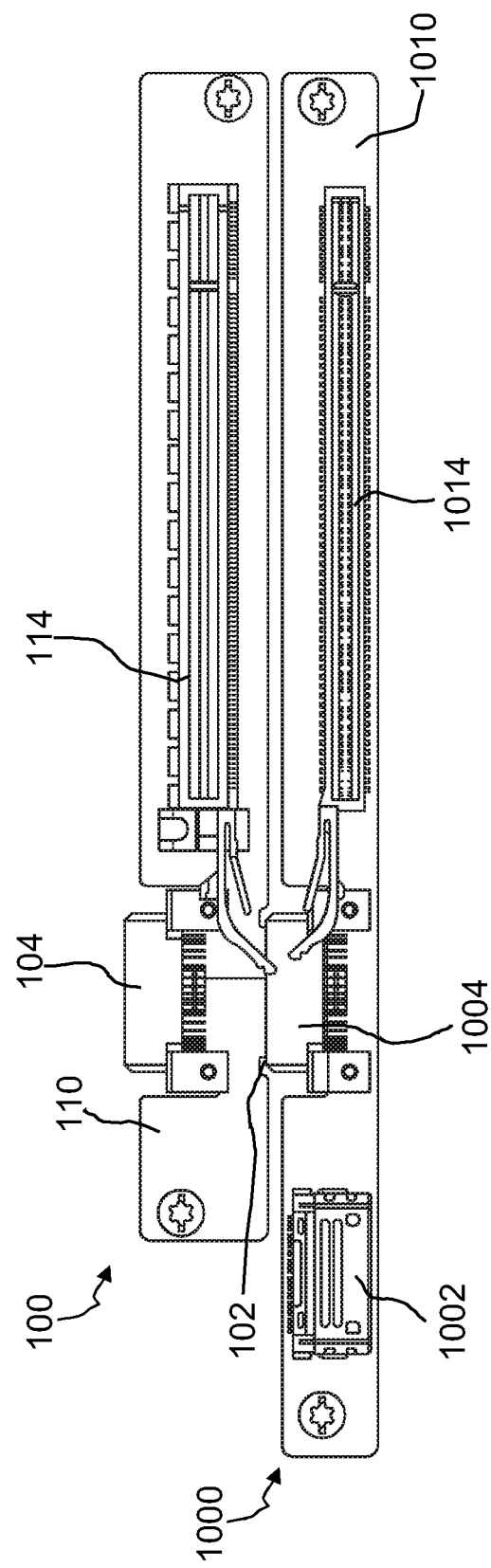
FIG. 12 is a front view of a stack including of a free height riser I/O slot and a stacking I/O slot according to one or more examples.

FIG. 12 shows an example of free height riser I/O slot 1000 having a first stacking cabled I/O slot 100 coupled thereto, with a first connector 102 of stacking cabled I/O slot 100 inserted into connector 1004 of free height riser I/O slot 1000. A cable or hardware connector (not shown) attached to connector 1002 on free height riser I/O slot 1000 enables the stack of free height riser I/O slot 1000 and stacking cabled I/O slot 100 to couple to a computing device, such as a motherboard.

Figure 13:
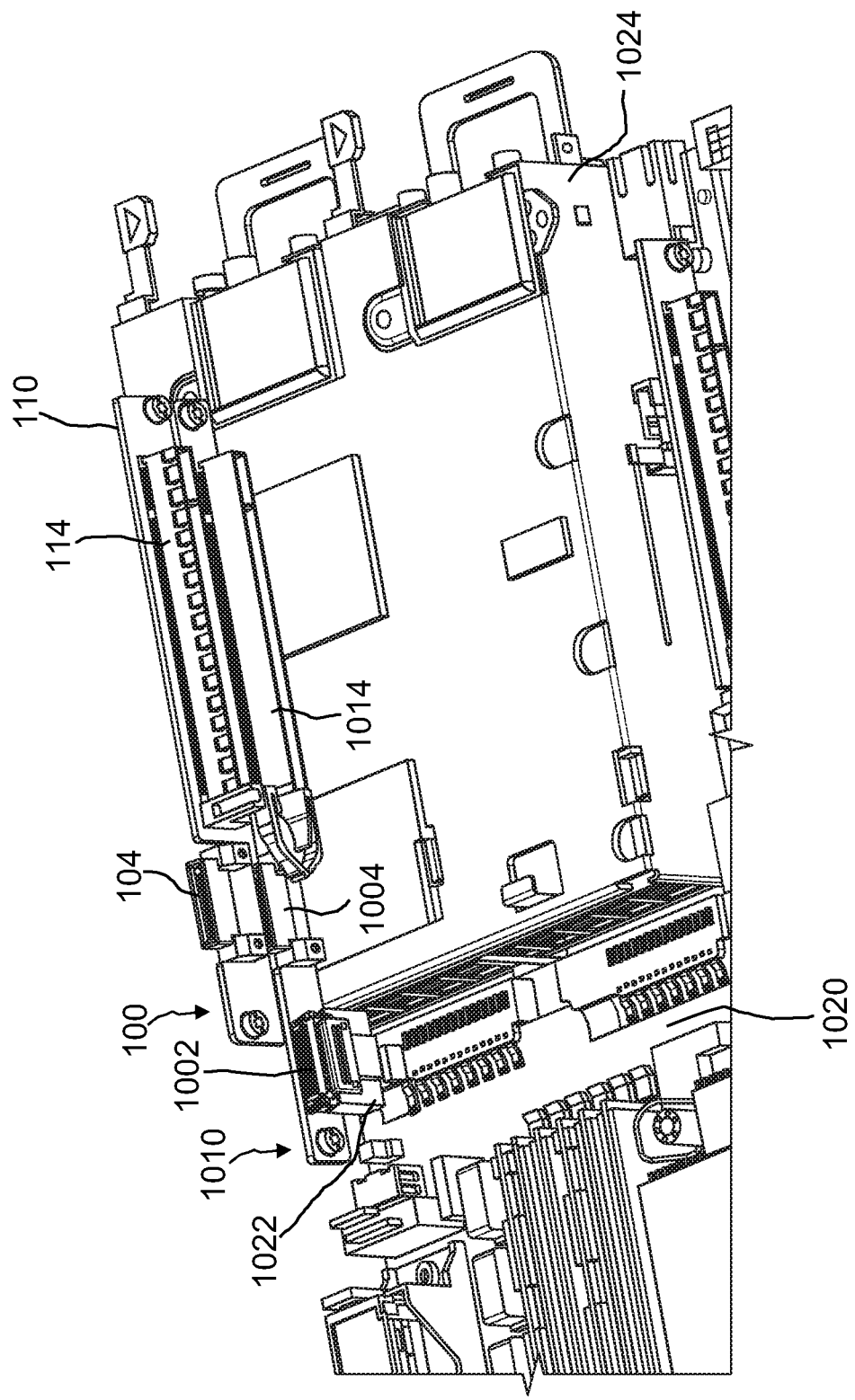
FIG. 13 is a perspective view of the stack including a free height riser I/O slot and a stacking I/O slot installed on a motherboard of a computing device according to one or more examples.
Figure 14:
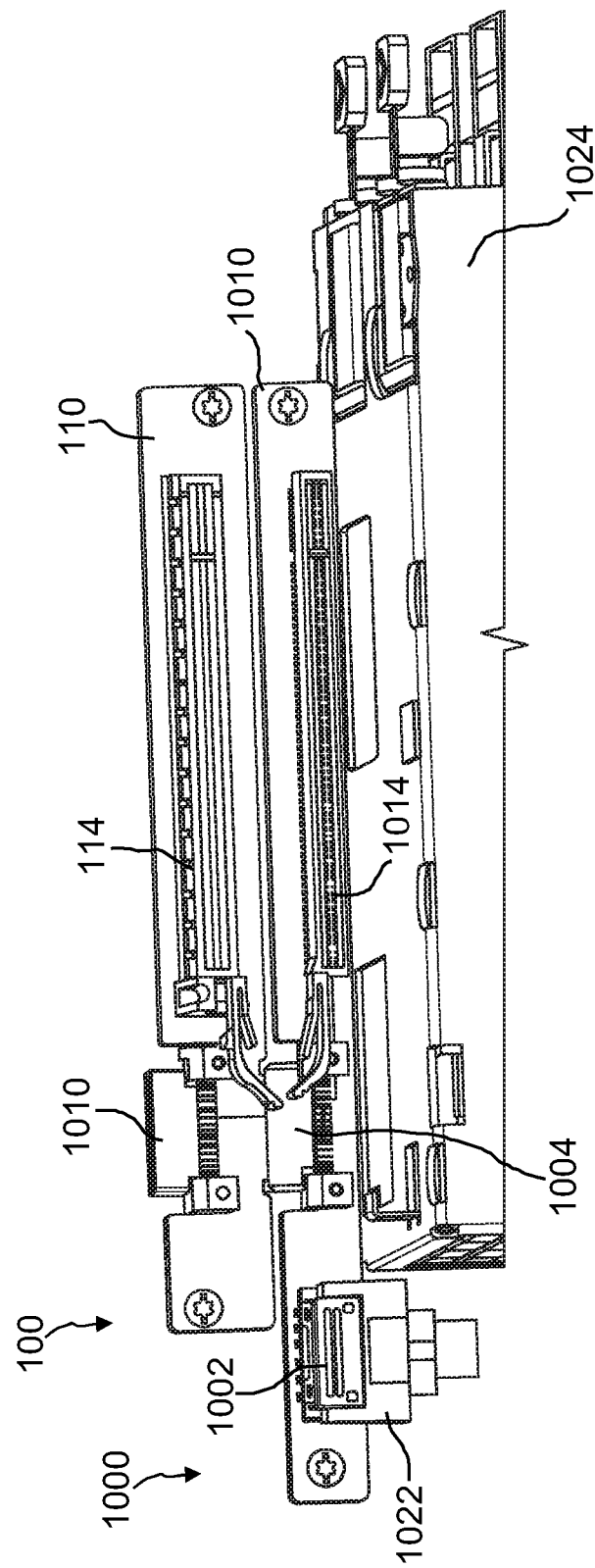
FIG. 14 is a perspective view of the stack including a free height riser I/O slot and a stacking I/O slot from FIG. 13.

Referring now to FIGS. 13 and 14, there is shown a front perspective view of free height riser I/O slot 1000 and stacking cabled I/O slot 100 having been installed on a computing device comprising a motherboard 1020. As shown in FIG. 13, connector 1002 of free height riser I/O slot 1000 is coupled to motherboard 1020 via a cable or hardware connector 1022. In some examples, this establishes power and logic signal connections and high-speed data connections between free height riser I/O slot 1000 and motherboard 1020. This permits high speed data signals coupled between I/O device socket 1014 (such as from an installed I/O device, not shown) to be communicated to motherboard 1020 via connector 1002 and 1022.

In the example of FIG. 13, the stack consisting of free height riser I/O slot 1000 and a first stacking cabled I/O slot 100 is installed above an additional component in the form of a power supply unit (PSU) 1024.

In some examples, an additional stacking I/O slot may be installed on stacking cabled I/O slot 100 shown in FIGS. 12 and 13, in the same manner that stacking I/O slots are combined in the examples of FIGS. 5 and 6. The one or more stacking cabled I/O slots 100 stacked onto free height I/O slot 1000 in the example of FIGS. 10-13 may each be coupled to motherboard 1020 via respective high-speed data cables (not shown in FIGS. 10-13) as described above with reference to the examples of FIGS. 5-6. A stack consisting of a free height I/O slot 1000 and one or more stacking cabled I/O slots 100 may be installed on top of an intervening component, such as PSU 1024 in the example of FIGS. 12 and 13.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:

1. A stacking cabled input/output ("I/O") slot installable on a computing device, comprising:
    an I/O device socket adapted to receive a mating connector of an I/O device;
    a cable having a first end coupled to the I/O device socket and a second end coupled to a first location on the computing device for communicating a first plurality of signals to the computing device from the I/O device, the first plurality of signals comprising data signals;
    a first connector adapted to mate with an I/O expansion socket at a second location on the computing device to communicate a second plurality of signals comprising control signals and power signals between the I/O expansion socket and the stacking cabled I/O slot;
    a second connector; and
    a slot allocation and population circuit, coupled to the first connector and the second connector, for detecting a second stacking cabled I/O slot coupled to the second connector and for driving the control signals in the second plurality of signals to identify a number and ordering of stacking cabled I/O slots.

2. The stacking cabled I/O slot of claim 1, wherein the first location and the second location are spaced apart by at least a minimum distance.

3. The stacking cabled I/O slot of claim 1, wherein the data signals of the first plurality of signals comprise high-speed data signals.

4. The stacking cabled I/O slot of claim 1, wherein the first plurality of signals includes system management signals identifying at least one stacking cabled I/O slot adapted to be coupled to the I/O expansion socket.

5. The stacking cabled I/O slot of claim 4, where the system management signals further identify a relative position between the stacking cabled I/O slot and a second stacking cabled I/O slot.

6. The stacking cabled I/O slot of claim 1, wherein the second connector of the stacking cabled I/O slot is further adapted to mate with a first connector of a second stacking cabled I/O slot.

7. A computing device, comprising:
    a motherboard, including
        a processor;
        a memory unit;
        a plurality of cable connectors; and
        an input/output ("I/O") expansion socket, the I/O expansion socket being spaced apart from the plurality of cable connectors; and
    at least one stacking cabled I/O slot installed in the I/O expansion socket, each of the at least one stacking cabled I/O slots including an I/O device socket adapted to receive a mating connector of an I/O device and a cable having a first end coupled to the I/O device socket and a second end including a cable connector mating to one of the plurality of cable connectors;
    each of the at least one stacking cabled I/O slots further including slot allocation and population circuitry having a system management bus connection coupled to the processor;
    wherein the slot allocation and population circuitry provides a plurality of logic signals to the processor identifying the presence and position of each stacking cabled I/O slot relative to any other stacking cabled I/O slot installed in the I/O expansion socket.

8. The computing device of claim 7, wherein the I/O expansion socket provides power to each of the at least one stacking cabled I/O slots.

9. The computing device of claim 7, wherein the cable of each of the at least one stacking cabled I/O slots comprises a high-speed data cable.

10. The computing device of claim 7, wherein the cable of each of the at least one stacking cabled I/O slots couples the system management bus connection to the processor.

11. The computing device of claim 7, wherein the plurality of cable connectors are located nearer to the processor on the motherboard than the I/O expansion socket.

12. The computing device of claim 7, wherein each of the at least one stacking cabled I/O slots has a first connector adapted to mate with the I/O expansion socket and a second connector adapted to mate with the first connector of any of the other at least one stacking cabled I/O slots.

13. The computing device of claim 12, wherein the slot allocation and population circuitry of the first of the at least one stacking cabled I/O slots is coupled to the first and second connectors of the first of the at least one stacking cabled I/O slot.

14. The computing device of claim 13, wherein the slot allocation and population circuitry of the first of the p least one stacking cabled I/O slots is adapted to communicate with a second of the at least one stacking cabled I/O slots via a connection between the second connector of the first of the at least one stacking cabled I/O slots and the first connector of the second of the at least one stacking cabled I/O slots.

15. A method of coupling at least one stacking cabled I/O slot to a computing device, comprising:
    mating a first connector of a first of the at least one stacking cabled I/O slots to an I/O expansion socket of the computing device;
    connecting a cable having a first end coupled to an I/O device socket of each of the at least one stacking cabled I/O slots and a second end coupled to at least one cable connector of the computing device, each of the at least one cable connectors being spaced apart from the I/O expansion socket;
    wherein power is supplied to each of the at least one stacking cabled I/O slot from the I/O expansion socket.

16. The method of claim 15, further comprising:
    connecting each of the at least one stacking cabled I/O slots to the computing device by a system management bus.

17. The method of claim 16, further comprising:
    communicating presence and relative position of each of the at least one stacking cabled I/O slots to the computing device via the system management bus.

18. The method of claim 15, further comprising:
    mating a first connector of a second of the at least one stacking cabled I/O slots to a second connector of the first of the at least one stacking cabled I/O slots.

19. The method of claim 18, further comprising:
communicating between the first and second of the at least one stacking cabled I/O slots to determine presence and relative position of each of the first and second of the at least one stacking cabled I/O slots.

20. A computing device, comprising:
a motherboard, including
- a processor;
- a memory unit; and
- a plurality of cable connectors;
- an input/output ("I/O") expansion socket, the I/O expansion socket being spaced apart from the plurality of cable connectors;
- a free height riser I/O slot, coupled to the I/O expansion socket via a first connector, the free height riser I/O slot including a second connector;

at least one stacking cabled I/O slot installed in the second connector of the free height riser I/O slot, each of the at least one stacking cabled I/O slots including an I/O device socket adapted to receive a mating connector of an I/O device and a cable having a first end coupled to the I/O device socket and a second end including a cable connector mating to one of the plurality of cable connectors;

wherein the free height riser I/O slot and each of the at least one stacking cabled I/O slots further including slot allocation and population circuitry having a system management bus connection coupled to the processor;

wherein the slot allocation and population circuitry of the free height riser I/O slot and each stacking cabled I/O slot provides a plurality of logic signals to the processor identifying presence and position of each stacking cabled I/O slot relative to any other stacking cabled I/O slot installed in the I/O expansion socket.

* * * * *